Jan. 8, 1963 T. C. WALDROP 3,071,796
PIPE WIPERS
Filed April 4, 1960

TOM C. WALDROP
INVENTOR.

BY
*Alexander & Troell*
ATTORNEYS

United States Patent Office 3,071,796
Patented Jan. 8, 1963

3,071,796
PIPE WIPERS
Tom C. Waldrop, Arlington, Tex., assignor to Empire Rubber Co., Grapevine, Tex., a corporation of Texas
Filed Apr. 4, 1960, Ser. No. 19,774
6 Claims. (Cl. 15—210)

By invention relates to oil well equipment, and more particularly relates to improvements in pipe wiper structures.

When withdrawing tubing, drill rods or sucker rods from oil wells, the rods bring considerable quantities of heavy oil, mud, or paraffin up on their outer surfaces, and it is desirable, if not necessary, to wipe the rods or tubing during such withdrawal in order to leave the accumulation of liquids within the well. A great many different structures have been proposed for the rubber portion of the wiper equipment, and it is to improvements in these structures that the present invention is directed.

It is a principal object of my invention to provide a pipe wiper which is reversible and which has an improved cross-sectional shape serving to both protect the wiping portion of the wiper from accidental pinching between the pipe passing therethrough and the bushing thereabove and at the same time functioning to restrict most of the stretching of the wiper caused by lateral motions of the pipe being wiped to that portion of the rubber which is nearer to the outer supporting ring of the wipe so that the inner wiping portion thereof remains in snug contact with the rod and is not weakened by frequent and severe distortions of said inner portion of the wiper in the vicinity of its pipe-receiving bore.

Another principal object of the invention is to provide a rubber pipe wiper structure having a pipe-receiving bore therethrough reinforced by an enlarged bead, said bead being joined by a flexible web bonded to an outer supporting ring of relatively harder rubber, said web having a cross-sectional thickness which tapers so that it becomes thinner near the outer supporting rim than in the vicinity of the inner bead, whereby the distortion of the web caused by lateral displacements from center of the pipe being wiped occur to a greater extent in the vicinity of the outer periphery of the web. The combination of a bead reinforcing the bore of the wiper, and of the taper of the web thickness assists the wiper to maintain continuous snug contact with the entire periphery of the pipe being wiped, and the bead reinforcement at the same time permitting the use of relatively soft rubber in the web and bead portions of the wiper so as to insure accurate following of the surfaces of the pipes including their joints as they pass through the wiper bore.

Still another object of the invention is to provide a pipe wiper consisting entirely of rubber of at least two degrees of hardness, the rubber being distributed in the wiper structure in such a way that the wiper is self-supporting without the necessity of employing metal parts embedded in the rubber. The harder rubber is located in the outer supporting ring and the softer rubber in the web, which distribution taken together with the taper of the web, provides novel and improved action of the wiper as compared with the action of conventional wipers wherein the entire inner periphery in the vicinity of the wiping bore stretches to a greater extent than the outer periphery of the wiper whenever the pipe being wiped moves laterally off center. In other words, in conventional wipers, due to frequent and extensive lateral distortions of the wiper in the immediate vicinity of the wiping bore, snug contact between the wiper and the pipe is soon lessened resulting in permanent distortion and/or lowering of the wiper efficiency.

As distinguished from this action of the prior-art wipers, the present pipe wipers stretch principally in the vicinity of the relatively thinner outer periphery of the web which flexibly joins the wiping bead with the outer supporting ring of the wiper. Since most of the stretching accurs near the outer periphery of the wiper and away from the wiping bead around the bore of the wiper, the result is that substantially constant wiping pressure is maintained against the pipe at all times and affords much longer useful life than is possible with the above-mentioned prior-art designs.

Still another object of the invention is to provide an improved symmetrically reversible bowl-shaped structure having a relatively great mass of rubber in the wiping bead to provide longer life of the wiper rubber before it becomes necessary to reverse it in the wiper assembly. Moreover, it is an important feature of the present invention that the outer supporting ring is relatively rigid and is much thicker as measured in the axial direction of the wiper than is the wiping bead, with the advantageous result that the wiping bead is recessed considerably below the rim of the bow-like structure and is therefore protected against the aforementioned pinching.

It is another principal object of the invention to provide a pipe wiper of bowl-shaped cross-section having liquid drainage ports extending radially through the periphery of the outer rim of the bowl and communicating with both surfaces of the web, the inner ends of the ports being bifurcated and having openings of restricted cross-section so that solid objects accidentally dropped on the upper surface of the wiper are deflected radially outwardly and thus discouraged from passing directly through the two inner openings of the ports and dropping into the bore of the well.

It is also an important feature of the invention that the ports are located away from the inner periphery of the wiper so that if a solid object should manage to pass through a port, the object would not tend to drop into the bore of the well but would tend to fall alongside the bore.

Other objects and advantages of my invention will become apparent during the following discussion of the drawing, wherein.

Figure 1:
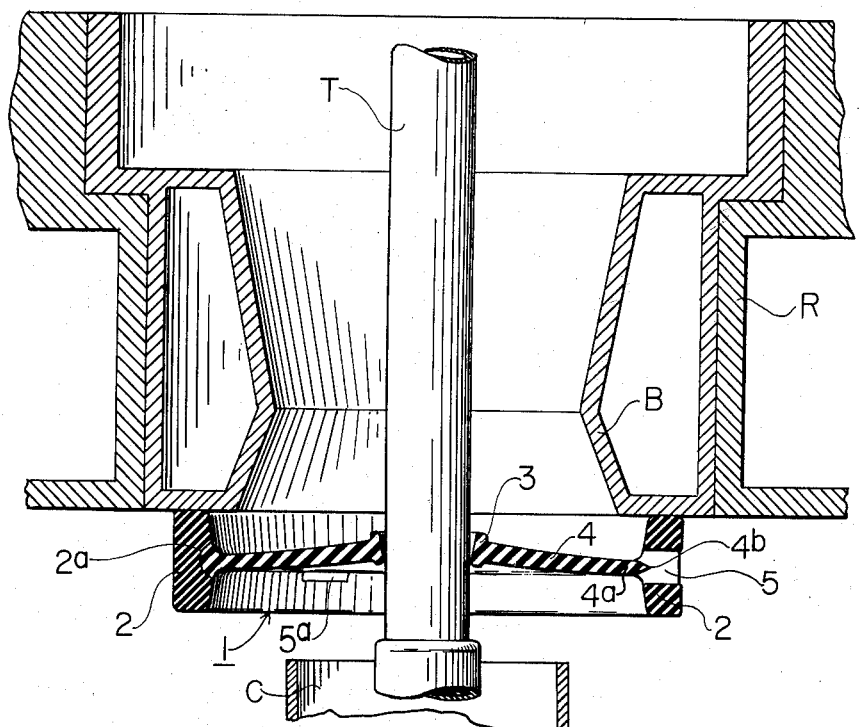
FIG. 1 is a cross-sectional view taken through the wiper and master bushing assembly of a well and showing my novel wiper in cross section engaging a tubing string being withdrawn from the well.
Figure 2:
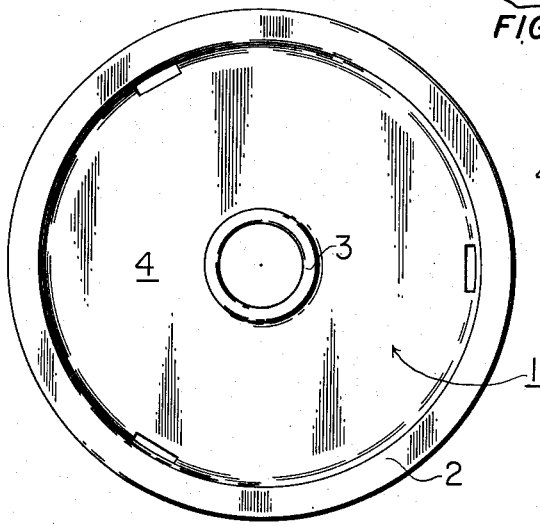
FIG. 2 is a plan view of a wiper according to the present invention.
Figure 3:
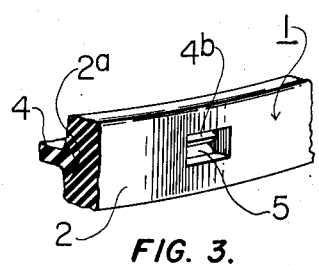
FIG. 3 is a fragmentary perspective view of a portion of the rim of my wiper showing one of the drainage ports.

Referring now to the drawing, FIG. 1 illustrates the floor R of an oil well rig including a master bushing B located above the upper end of the oil well casing C, a string of tubing T extending out of the casing C and through the bushing B.

Surrounding the tubing T and abutting the lower surface of the bushing B is a pipe wiper 1 according to my invention. This pipe wiper comprises an outer supporting ring portion 2 and an inner wiping bead 3 and web portion 4 joining the inner bead and outer ring portion. The pipe wiper when in relaxed position (meaning that there is no tubing T extending through the bore in the wiper and distorting the web) is entirely symmetrical about a plane passing radially through the center of the web. The upper and lower portions of the wiping bead 3 are symmetrical about such a plane, and also the upper and lower surfaces of the outer supporting ring 2 are symmetrical about this plane and form bowl-shaped structures symmetrically disposed on both sides of the pipe wiper. Note that the bowl-shaped structure places the web portion 4 and the bead 3 far enough below the bushing B that pinching of the web or the bead between the bushing B and the tubing T is unlikely, if not altogether impossible when the tubing T is laterally displaced off-center.

It is also important to note in FIG. 1 that the thickness of the web 4 tapers outwardly so that it becomes thinner and thinner away from the bead 3 until its minimum thickness occurs at 4a substantially adjacent the outer supporting ring 2. As stated in the objects of the invention, it is desirable that when the tubing T becomes displaced laterally off-center the principal distortion of the web portion 4 will occur near its outer periphery so as to minimize the likelihood of disturbing the snug fit between the inner periphery of the web including the bead 3 and the outer surface of the tubing T. The outer periphery of the web 4 smoothly joins the inner surface of the main supporting ring 2, and in the vicinity of this juncture at the line 2a the hardness of the rubber changes, the harder rubber being located in the main supporting ring 2 so as to provide it with considerable rigidity and the softer rubber being located in the web 4 and the bead 3 so that this portion of the wiper will be flexible and long-lasting. No metal whatever is used in the structure of the wiper.

A plurality of drainage ports 5 extend through the periphery of the structure and are disposed substantially radially in the outer ring 5. These ports communicate with both of the surfaces of the web 4 through slot-shaped openings such as the opening 5a in FIG. 1. A small extension 4b of the web 4 extends partway through each inner opening of the port 5 and thereby prevents the port from being of the see-through type, the extension 4 tapering to an edge to provide sloping surfaces tending to deflect solid objects outwardly in a radial direction through the port, rather than permitting such objects to drop straight through both of the inner openings 5a which are associated with the same port but open toward opposite faces of the web 4.

I do not limit my invention to the exact structure shown in the drawing, for obviously changes may be made in this structure within the scope of the following claims.

I claim:

1. An annular pipe wiper of rubber material having an axial pipe-receiving bore therethrough, comprising a flexible radial web portion having an inner periphery defining said bore and including on both sides of the web portion a thickened wiping bead surrounding the bore; and a thick outer supporting ring portion joined to the outer periphery of the web portion and extending therebeyond in both axial directions, and said ring portion having at least one drainage port extending radially through the ring portion substantially centered therein with respect to the web portion and of larger cross section than the thickness of the adjacent web portion and said at least one port opening through the inner periphery of the ring portion in two places on opposite sides of the web portion.

2. In a wiper as set forth in claim 1, the web portion extending outwardly partway into each drainage port to prevent solid objects from dropping straight through the wiper by passing directly through the two inner openings of a port.

3. In a wiper as set forth in claim 1, the web portion extending outwardly partway into each drainage port and tapering gradually to an edge therein to provide sloping surfaces adapted to deflect solid objects radially outwardly through the port and prevent passage thereof straight through the two inner openings of a port.

4. An annular pipe wiper of rubber material having an axial pipe-receiving bore therethrough, comprising a flexible radial web portion having an inner periphery defining said bore, said web portion being thicker in the vicinity of the bore and thinner in the vicinity of its outer periphery; and a thick relatively rigid outer supporting ring portion joined to the outer periphery of the web portion and extending therebeyond in both axial directions, said ring portion having at least one drainage port extending substantially radially through the ring portion at its outer end and said at least one part being bifurcated intermediate its ends and extending through the inner periphery of the ring portion on both sides of said web portion.

5. In a wiper as set forth in claim 4, said ring portion extending outwardly in the axial direction beyond the web portion.

6. The wiper as set forth in claim 4, wherein the ring portion is made of harder material and the web portion is made of softer more flexible material, the two hardnesses of material being mutually bonded together.

References Cited in the file of this patent

UNITED STATES PATENTS

| | | |
|---|---|---|
| 2,272,395 | Ballagh | Feb. 10, 1942 |
| 2,655,679 | Grant | Oct. 20, 1953 |
| 2,809,387 | Paiso | Oct. 15, 1957 |

FOREIGN PATENTS

| | | |
|---|---|---|
| 703,673 | Great Britain | Feb. 10, 1954 |